United States Patent Office 3,538,022
Patented Nov. 3, 1970

3,538,022
ELECTRICALLY CONDUCTIVE ZINC OXIDE
Robert S. Bowman, Pittsburgh, Pa., assignor to St. Joseph Lead Company, New York, N.Y., a corporation of New York
No Drawing. Filed July 28, 1967, Ser. No. 656,689
Int. Cl. H01b 1/06
U.S. Cl. 252—518                                      6 Claims

ABSTRACT OF THE DISCLOSURE

Normally nonconductive zinc oxide is converted into an electrically conductive form by heating the zinc oxide in a reducing atmosphere in admixture with a relatively small proportion of an oxide of aluminum, gallium or indium or a precursor thereof convertible into such oxide under the conditions of treatment.

---

The invention relates to the preparation of electrically conductive zinc oxide.

I have found that normally non-conductive zinc oxide, either French or American process, can be converted into an electrically conductive form by heating the zinc oxide for a relatively short time in a reducing atmosphere to a temperature in the range of from about 600° C. to about 900° C. in admixture with an oxide of a metal of the group consisting of aluminum oxide, gallium oxide and indium oxide or a precursor thereof convertible into such oxide under the conditions of treatment.

The activating substances are used in relatively small proportions of the order of from about 0.01 to about 5.0 atom percent based on the zinc oxide and, in general, amounts of the activating substances in the range of from about 0.03 to 1.0 atom percent are preferred. The oxides or their precursors may be mixed with the zinc oxide in the dry form prior to the heating operation. Preferably such mixtures are sprayed with water in the mixer in an amount, for example, of about 5 parts by weight of water to 20 parts by weight of the mixture to give a damp powder which is dried in air before being heated. When water-soluble precursors, such as the nitrates and sulfates, are used they are preferably dissolved in water, for example, in about 5 parts by weight of water to 20 parts by weight of zinc oxide, and the solution sprayed on the zinc oxide in a mixer to give a damp powder which is then air dried before being heated.

The mixture of zinc oxide and activating agent is heated to the desired temperature in a reducing atmosphere. The reducing atmosphere may be hydrogen or carbon monoxide, or a mixture of nitrogen with hydrogen or carbon monoxide, for example, in the proportion of from about 5 to about 50 percent of hydrogen or carbon monoxide by volume.

The heating may be carried out in refractory reactor tubes either batch-wise or in continuous flow through the reactor tubes. In general, a heating period of about 15 minutes is sufficient. The product is preferably allowed to cool to room temperature in the reducing atmosphere.

The high conductivities imparted to zinc oxides by the method of the invention are exceptionally stable even when the treated zinc oxide products are subjected to moisture and heating in air. It is believed that the stable conductivity is related to the fact that the ionic radii of the $M^{+++}$ ions of aluminum, gallium and indium are close to that of the $Zn^{++}$ ion and to the fact that electron configurations of aluminum, gallium and indium are regular.

The following example is illustrative of the method of the invention:

Twenty parts by weight of dry non-conductive zinc oxide and .097 part by weight of dry indium oxide ($In_2O_3$) (corresponding to 0.6 atom percent dosage) are thoroughly mixed by tumbling and shaking. The mass is then sprayed with a finely atomized stream of water, using about 5 parts by weight of water. The damp, but tractable, powder is then dried in air and then degassed in a stream of nitrogen in a quartz reactor tube. During this degassing step the temperature of the material is brought to 800° C. by placing the reactor tube in a furnace preadjusted to the desired temperature. Hydrogen gas, comprising about 10 volume percent of the total gas flow, is then added to the nitrogen stream. The material is allowed to remain at 800° C. for 15 minutes, after which the reactor tube is withdrawn from the furnace. The product is allowed to cool to room temperature in the nitrogen-hydrogen, or in a nitrogen stream. The product is light gray and has a DC volume resistivity of 6 ohm-cm.

Results obtained with other activating agents and other conditions of treatment are given in the following table:

| | Processing temp., °C. | Atom percent activator | D.C. resistivity, ohm-cm. |
|---|---|---|---|
| Activator: | | | |
| $Al(OH)_3$ | 800 | 0.6 | $8.8 \times 10^3$ |
| $Al_2O_3$ | 900 | 0.6 | $1.9 \times 10^3$ |
| $Na_2O \cdot Al_2O_3$ | 900 | 0.6 | $3.8 \times 10^4$ |
| $Ga_2O_3$ | 800 | 0.6 | 5 |
| $Ga_2O_3$ | 900 | 0.6 | 0.5 |
| $Ga_2O_3$ | 900 | 0.06 | 82 |
| $Ga_2O_3$ | 900 | 0.03 | 17 |
| $In(OH)_3$ | 800 | 0.6 | 70 |
| $In(OH)_3$ | 900 | 0.6 | 33 |
| $In_2O_3$ | 800 | 0.6 | 50 |
| $In_2O_3$ | 800 | 0.06 | $3.1 \times 10^2$ |
| $Al(NO_3)_3$ | 800 | 0.6 | $2.3 \times 10^3$ |
| $Al(NO_3)_3$ | 900 | 0.78 | $1.6 \times 10^2$ |
| $Al(NO_3)_3$ | 900 | 0.3 | $1.8 \times 10^3$ |
| $In(NO_3)_3$ | 800 | 0.6 | 54 |
| $In(NO_3)_3$ | 900 | 0.6 | 92 |
| $In_2CO_3$ | 800 | 0.6 | 40 |
| $In_2CO_3$ | 800 | 0.06 | $1.9 \times 10^4$ |
| $Ga(NO_3)_3$ | 800 | 0.15 | $2.4 \times 10^2$ |
| $Al_2(SO_4)_3$ | 800 | 0.6 | $8.6 \times 10^2$ |
| $Al_2(SO_4)_3$ | 900 | 0.6 | $4.0 \times 10^2$ |
| $Al_2(SO_4)_3$ | 900 | 0.06 | $5.8 \times 10^3$ |
| $Ga_2(SO_4)_3$ | 900 | 0.06 | $9.6 \times 10^2$ |
| $In_2(SO_4)_3$ | 900 | 0.06 | $7.3 \times 10^2$ |

The term "atom percent" as used in the specification and claims hereof designates the atoms of activator metal per 100 molecules of zinc oxide.

I claim:
1. A method of preparing electrically conductive zinc oxide which comprises heating zinc oxide to a temperature of from about 600° C. to about 900° C. in a reducing atmosphere in admixture with an oxide of a metal of the group consisting of aluminum, gallium and indium in an amount equivalent to from about 0.01 to about 5.0 atom percent based on the zinc oxide.

2. A method of preparing electrically conductive zinc oxide as defined in claim 1 wherein the amount of oxide is equivalent to from about 0.03 to 1.0 atom percent based on the zinc oxide.

3. A method of preparing electrically conducting zinc oxide as defined in claim 1 wherein the heating is carried out in an atmosphere of nitrogen mixed with from about 5 to about 50 parts by volume of hydrogen.

4. A method of preparing electrically conductive zinc oxide as defined in claim 1 wherein the oxide is gallium oxide.

5. A method of preparing electrically conductive zinc oxide as defined in claim 1 wherein the oxide is indium oxide.

6. A method of preparing electrically conductive zinc oxide as defined in claim 1 wherein the oxide is aluminum oxide.

References Cited

UNITED STATES PATENTS

| 2,887,632 | 5/1959 | Dalton | 252—512 |
| 3,089,856 | 5/1963 | Cyr | 252—501 |
| 3,264,229 | 8/1966 | Klein | 252—518 |

DOUGLAS J. DRUMMOND, Primary Examiner

U.S. Cl. X.R.

23—147; 106—296